(12) United States Patent
Fiveland et al.

(10) Patent No.: US 11,035,317 B2
(45) Date of Patent: Jun. 15, 2021

(54) CONTROLLING PILOT FUEL INJECTION IN AN ENGINE

(71) Applicant: Caterpillar Inc., Deerfield, IL (US)

(72) Inventors: Scott Fiveland, Washington, IL (US);
Arvind Sivasubramanian, Peoria, IL (US); Shivangi Wagle, Peoria, IL (US);
Shawn Damm, Peoria, IL (US);
Christopher Gallmeyer, Chillicothe, IL (US); Andy Pierpont, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 98 days.

(21) Appl. No.: 16/433,839

(22) Filed: Jun. 6, 2019

(65) Prior Publication Data

US 2020/0386175 A1 Dec. 10, 2020

(51) Int. Cl.
| | | |
|---|---|---|
| *F02D 41/40* | (2006.01) | |
| *F02D 41/00* | (2006.01) | |
| *F02D 41/14* | (2006.01) | |
| *F02D 19/10* | (2006.01) | |
| *F02D 19/06* | (2006.01) | |

(52) U.S. Cl.
CPC ....... *F02D 41/403* (2013.01); *F02D 19/0642* (2013.01); *F02D 19/10* (2013.01); *F02D 41/0027* (2013.01); *F02D 41/1462* (2013.01); *F02D 2200/024* (2013.01); *F02D 2200/0418* (2013.01); *F02D 2200/0611* (2013.01)

(58) Field of Classification Search
CPC ... F02D 19/02–029; F02D 19/06–0647; F02D 41/0025; F02D 41/0027; F02D 41/1444; F02D 41/146–1462; F02D 41/30; F02D 41/402–403; F02B 7/06; F02B 7/08

USPC ..... 701/104; 123/27 GE, 299, 525, 526, 575
See application file for complete search history.

(56) References Cited

U.S. PATENT DOCUMENTS

| | | | |
|---|---|---|---|
| 7,007,661 B2 * | 3/2006 | Warlick | F02D 35/027 |
| | | | 123/27 GE |
| 7,673,618 B2 | 3/2010 | Hasegawa et al. | |
| 8,150,596 B2 | 4/2012 | Kweon et al. | |
| 9,212,618 B2 | 12/2015 | Sivasubramanian et al. | |
| 9,759,142 B2 | 9/2017 | Kweon et al. | |
| 10,578,041 B1 * | 3/2020 | Han | F02D 41/401 |

(Continued)

FOREIGN PATENT DOCUMENTS

| | | |
|---|---|---|
| JP | 4409376 B2 | 1/2006 |
| JP | 2008082227 A | 4/2008 |
| WO | 2013183163 A1 | 12/2013 |

*Primary Examiner* — Erick R Solis
*Assistant Examiner* — Robert A Werner
(74) *Attorney, Agent, or Firm* — Hibshman Claim Construction PLLC (57) ABSTRACT

A control system for controlling pilot fuel injection in a dual fuel engine is disclosed. The control system may determine, using measurements from one or more sensors, one or more combustion parameters associated with the dual fuel engine during operation of the dual fuel engine. The control system may determine an estimated nitrogen oxides (NOx) emissions level based on the one or more combustion parameters, and may determine a NOx error based on a comparison between the estimated NOx emissions level and a desired NOx emissions level. The control system may control a quantity of pilot fuel injected into the dual fuel engine based on the NOx error.

19 Claims, 5 Drawing Sheets

(56) References Cited

U.S. PATENT DOCUMENTS

| | | | | |
|---|---|---|---|---|
| 2003/0221661 | A1* | 12/2003 | Willi | F02D 19/10 |
| | | | | 123/299 |
| 2004/0098190 | A1* | 5/2004 | Nakayama | F02D 41/1408 |
| | | | | 701/104 |
| 2004/0194451 | A1* | 10/2004 | Kawatani | F01N 3/2066 |
| | | | | 60/286 |
| 2007/0079817 | A1* | 4/2007 | VanDyne | F02D 35/021 |
| | | | | 123/568.21 |
| 2010/0162688 | A1* | 7/2010 | Chang | F01N 3/0814 |
| | | | | 60/286 |
| 2016/0208764 | A1* | 7/2016 | Mann | F02P 5/152 |

* cited by examiner

CONTROLLING PILOT FUEL INJECTION IN AN ENGINE

TECHNICAL FIELD

The present disclosure relates generally to pilot ignition engines and to controlling pilot fuel injection into a combustion chamber of an engine, such as a dual fuel engine or a micropilot engine.

BACKGROUND

Natural gas and other gaseous fuels such as propane are generally less expensive to produce, and result in lower engine emissions, than other fuels such as diesel fuel. However, natural gas does not easily combust from compression like diesel fuel. To assist with combustion of natural gas in a combustion chamber of an engine (e.g., a dual fuel engine or a micropilot engine), a small amount of diesel fuel (e.g., pilot fuel) may be introduced into the combustion chamber and compressed, which leads to ignition of the diesel fuel and subsequent combustion of the natural gas in the combustion chamber.

Combustion characteristics of gaseous fuels like natural gas vary with engine operating conditions. For instance, the air/fuel ratio and density in the combustion chamber, which can change with different engine loads, affect the combustion characteristics in the combustion chamber. Thus, the optimum amount of pilot fuel required to successfully ignite the natural gas can vary depending on engine operating conditions. Precise and reliable control of combustion is important for efficiency and safety of the combustion process. For example, excess pilot fuel may result in fast combustion rates and high combustion temperatures, which result in high nitrogen oxides (NOx or $NO_x$) emissions (e.g., nitric oxide (NO) emissions, nitrogen dioxide ($NO_2$) emissions, and/or other emissions of mixtures of gases that are composed of nitrogen and oxygen), while too little pilot fuel can cause incomplete combustion, which results in high unburned hydrocarbon (UHC) emissions and reduces engine efficiency.

One attempt to control micro pilot fuel injection to minimize NOx and UHC emissions is disclosed in U.S. Pat. No. 7,007,661 that issued to Warlick on Mar. 7, 2006 ("the '661 patent"). In particular, the '661 patent discloses a control system that controls the amount and timing of pilot fuel injection, such as diesel fuel, to obtain minimum NOx and UHC emissions. The control system senses if combustion occurs, when combustion occurs, and/or the quality of combustion in the combustion chamber of each cylinder of the gaseous fuel engine and adjusts the amount and/or timing of the pilot fuel injected.

However, the control system of the '661 patent does not estimate a NOx emissions level and adjust pilot fuel injection based on the estimated NOx emissions level and/or a desired NOx emissions level. Thus, the control system of the '661 patent may result in less efficient engine operation, higher NOx emissions, and/or sub-optimal engine performance due to accounting for a small number of factors that influence NOx emissions. Furthermore, the control system of the '661 patent is not capable of determining a reactivity parameter representative of fuel quality for different fuel mixtures during operation of the engine.

The control system of the present disclosure solves one or more of the problems set forth above and/or other problems in the art.

SUMMARY

A method for controlling pilot fuel injection in a dual fuel engine may include determining, by a control system, one or more combustion parameters of the dual fuel engine during operation of the dual fuel engine; determining, by the control system, an estimated nitrogen oxides (NOx) emissions level based on the one or more combustion parameters; comparing, by the control system, the estimated NOx emissions level and a desired NOx emissions level; determining, by the control system, a NOx error based on comparing the estimated NOx emissions level and the desired NOx emissions level; and controlling, by the control system, a quantity of pilot fuel injected into the dual fuel engine based on the NOx error.

A control system for controlling pilot fuel injection in a dual fuel engine may include memory; one or more sensors; and one or more controllers communicatively coupled to the memory. The one or more controllers may be configured to: determine, using measurements from the one or more sensors, one or more combustion parameters associated with the dual fuel engine during operation of the dual fuel engine; determine an estimated NOx emissions level based on the one or more combustion parameters; determine a NOx error based on a comparison between the estimated NOx emissions level and a desired NOx emissions level; and control a quantity of pilot fuel injected into the dual fuel engine based on the NOx error.

A dual fuel engine may include a control system configured to determine one or more combustion parameters associated with the dual fuel engine; determine an estimated NOx emissions level based on the one or more combustion parameters; compare the estimated NOx emissions level and a desired NOx emissions level; determine a NOx error based on the comparison between the estimated NOx emissions level and the desired NOx emissions level; and control a quantity of pilot fuel injected into the dual fuel engine based on the NOx error.

DETAILED DESCRIPTION

This disclosure relates to internal combustion engines and, more particularly, to a control system for controlling pilot fuel injection into one or more combustion chambers of an engine. The implementations described herein may be applied to an engine that uses a pilot fuel to ignite another type of fuel in the combustion chamber, such as an injection engine, a dual fuel engine (e.g., an engine that uses a first fuel as a pilot fuel for injection and/or ignition and a second fuel as the main fuel for combustion), a pilot engine, a micropilot engine, and/or the like.

Figure 1:
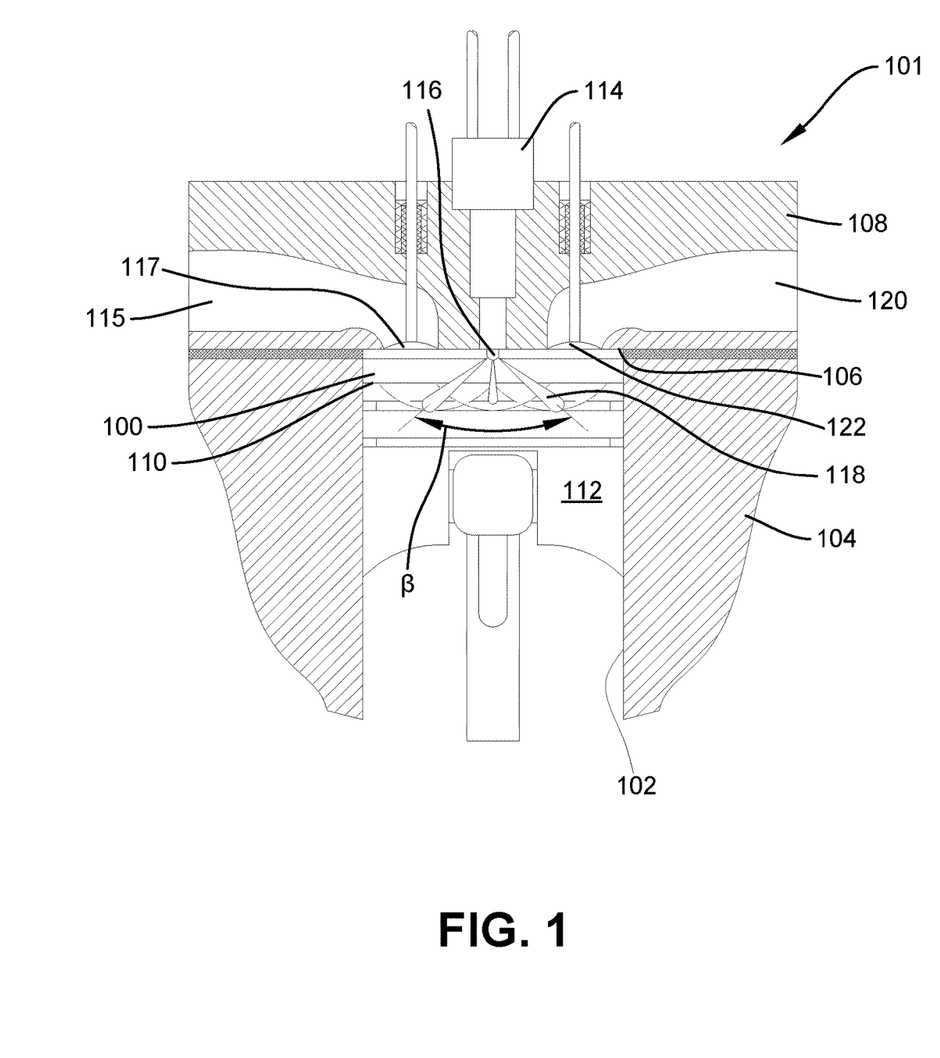
FIG. 1 is a diagram of a cross section of an example combustion chamber of an engine.

FIG. 1 is a diagram of a cross section of an example combustion chamber 100 of an engine 101, such as a micropilot engine (e.g., that uses an amount of pilot fuel that is less than or equal to a threshold percent of total fuel combusted in the engine 101, such as 2% or the like), a dual fuel engine, and/or the like. The combustion chamber 100 has a generally cylindrical shape that is defined within a cylinder bore 102 formed within a crankcase or engine block 104 of the engine 101. The combustion chamber 100 is further defined at one end by a flame deck surface 106 of a cylinder head 108, and at another end by a piston crown 110 of a piston 112 that is reciprocally disposed within the cylinder bore 102. A fuel injector 114 is mounted in the cylinder head 108. The fuel injector 114 has an injector tip 116 that protrudes within the combustion chamber 100 through the flame deck surface 106 such that the fuel injector 114 can directly inject fuel into the combustion chamber 100.

During operation of the engine 101, air and/or a first fuel used as a combustion fuel (e.g., natural gas, liquified natural gas, a synthetic derivative of liquified natural gas, and/or the like) is admitted into the combustion chamber 100 via an inlet passage 115 when one or more intake valves 117 (one shown) are open during an intake stroke. A second fuel (e.g., diesel fuel) under high pressure is permitted to flow through nozzle openings in the injector tip 116 to form fuel jets that enter the combustion chamber 100. Each nozzle opening creates a fuel jet 118 that generally disperses to create a predetermined fuel/air mixture, which in a compression ignition engine auto-ignites and combusts, which leads to combustion of the first fuel. Following combustion, exhaust gas is expelled from the combustion chamber 100 through an exhaust conduit 120 when one or more exhaust valves 122 (one shown) is/are open during an exhaust stroke. A quantity, timing, and/or rate of fuel injection by one or more fuel injectors 114 can be controlled by a control system, as described in more detail below.

As indicated above, FIG. 1 is provided as an example. Other examples may differ from what is described in connection with FIG. 1.

Figure 2:
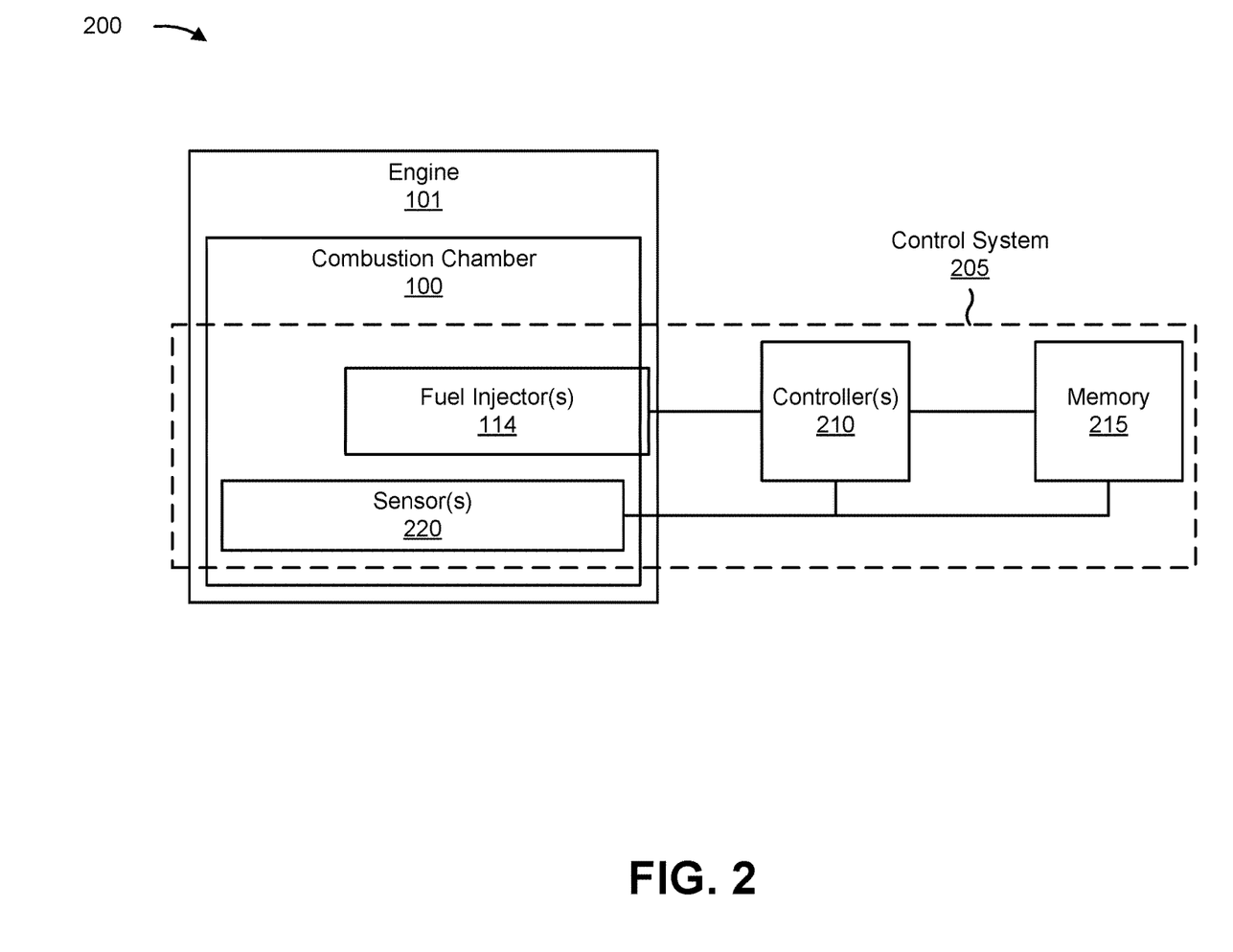
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an engine 101 and a control system 205. The engine 101 may include at least one combustion chamber 100 into which fuel is injected by one or more fuel injectors 114. The control system 205 may include one or more controllers 210, memory 215, and/or one or more sensors 220. The sensor(s) 220 may be located in or proximate to the engine 101, the combustion chamber 100, and/or the fuel injector(s) 114.

The control system 205 may receive input from the sensor(s) 220, may operate on the input, and may provide output to act on one or more fuel injectors 114. For example, a sensor 220 may measure one or more combustion parameters during operation of the engine 101 and may provide the one or more combustion parameters to a controller 210. Additionally, or alternatively, the sensor 220 may measure one or more values during operation of the engine 101, and the controller 210 may use the one or more values to derive the one or more combustion parameters (e.g., by performing one or more calculations using the one or more values, by inferring or estimating the one or more combustion parameters using the one or more values, and/or the like). The controller 210 may determine an estimated NOx emissions level based on the one or more combustion parameters and may compare the estimated NOx emissions level and a desired NOx emissions level, which may be stored in memory 215 and/or determined by the controller 210 based on the combustion parameters and/or other factors. The controller 210 may determine a NOx error based on comparing the estimated NOx emissions level and the desired NOx emissions level and may control a quantity of pilot fuel injected into the engine 101 based on the NOx error. For example, the controller 210 may control the quantity of pilot fuel (e.g., a quantity per injection, a quantity across injections, a rate of injection, a timing of injection, and/or the like) by controlling one or more fuel injectors 114 (e.g., by controlling one or more actuators of a fuel injector 114, by providing input to a fuel injection controller, and/or the like).

The controller 210 is implemented in hardware, firmware, and/or a combination of hardware and software. The controller 210 may include a processor, a central processing unit (CPU), a microcontroller, or another type of processing component. Controller 210 may be capable of being programmed to perform one or more operations described herein. Memory 215 includes a random access memory (RAM), a read only memory (ROM), and/or another type of dynamic or static storage device that stores information and/or instructions for use by controller 210. The sensor 220 may include a pressure sensor (e.g., an in-cylinder pressure sensor), an air system sensor, a humidity sensor, or another type of sensor capable of measuring one or more combustion parameters described herein and/or capable of measuring one or more values used to derive the one or more combustion parameters described herein.

As indicated above, FIG. 2 is provided as an example. Other examples may differ from what is described in connection with FIG. 2. For example, environment 200 may include additional elements, fewer elements, different elements, or differently arranged elements than those shown in FIG. 2.

Figure 3:
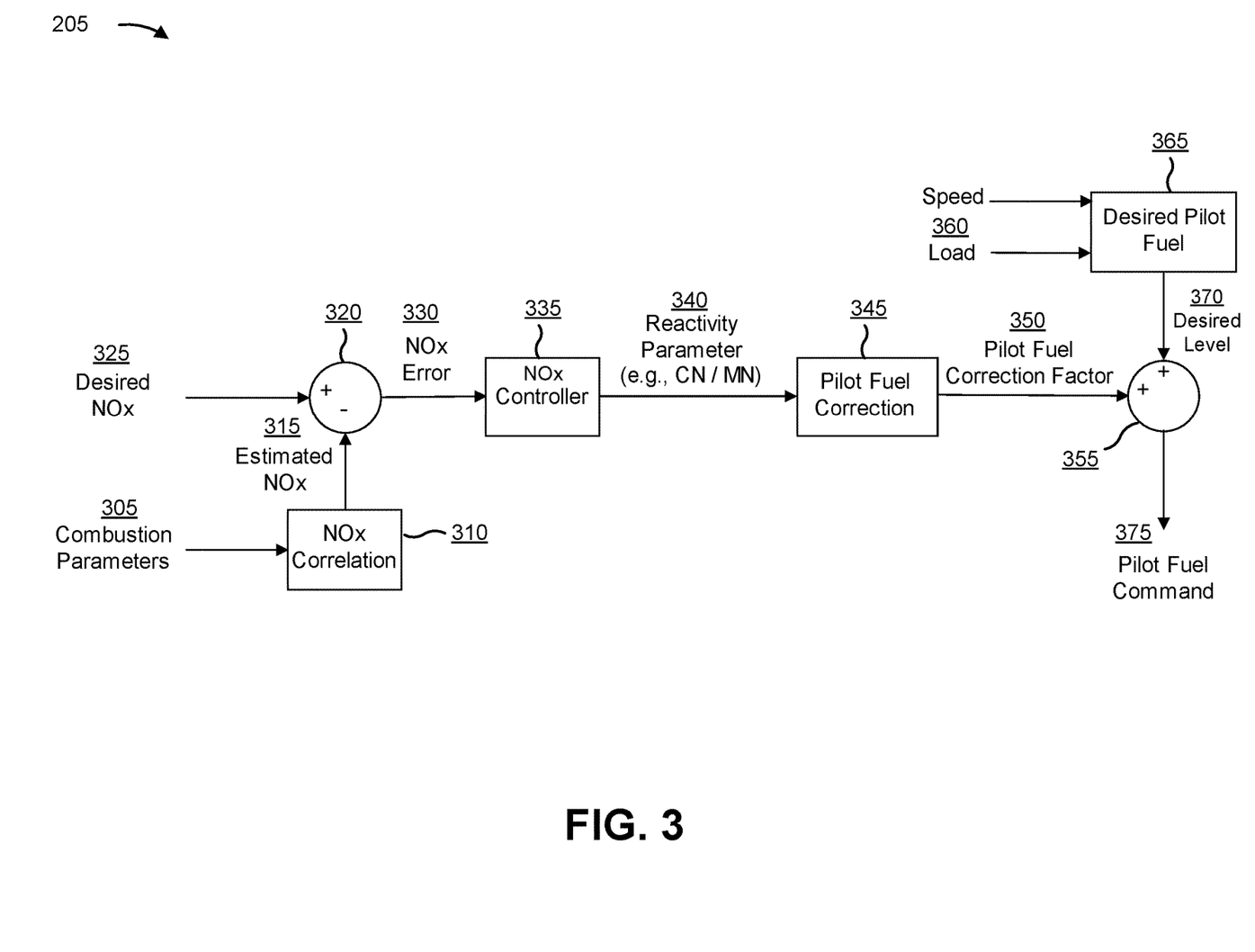
FIG. 3 is a diagram of an example control system for controlling pilot fuel injection into a combustion chamber of an engine.

FIG. 3 is a diagram of an example control system 205 for controlling pilot fuel injection into a combustion chamber 100 of an engine 101. One or more operations described below in connection with FIG. 3 may be performed by control system 205 and/or one or more components of control system 205, such as controller 210, memory 215, and/or sensor(s) 220. Additionally, or alternatively, one or more components described below in connection with FIG. 3 may include or be included in controller 210, memory 215, and/or the like.

At 305, the control system 205 (e.g., using one or more sensors 220) may determine one or more combustion parameters of an engine 101. As shown, the combustion parameter(s) may be input from one or more sensors 220 to a NOx correlation component 310. In some implementations, a combustion parameter may be measured by one or more sensors 220 during operation of the engine 101, and may be transmitted by the one or more sensors 220 to the NOx correlation component 310. Additionally, or alternatively, control system 205 may determine a combustion parameter based on one or more values received from the one or more sensors 220, and may provide the combustion parameter to the NOx correlation component 310.

The one or more combustion parameters may include, for example, a peak cylinder pressure, a location of the peak cylinder pressure, a maximum rate of rise of cylinder pressure, an instantaneous maximum heat release rate, a location of the instantaneous maximum heat release rate, a location of a threshold percentile fuel burn (e.g., location of 1% fuel burn, a location of 5% fuel burn, a location of 10% fuel burn, a location of 50% fuel burn, a location of 90% fuel burn, and/or the like), an ignition delay from a start of injection to a threshold percentile fuel burn location (e.g., an ignition delay from a start of injection to a 1% fuel burn location, an ignition delay from a start of injection to a 5% fuel burn location, an ignition delay from a start of injection to a 10% fuel burn location, and/or the like), a combustion duration for a burn location (e.g., a combustion duration for a range of burn locations, such as from 5% burn to 90% burn, from 10% burn to 90% burn, and/or the like), an air fuel ratio, a humidity, or an exhaust gas recirculation parameter. As used herein, a location of a threshold percentile fuel burn may refer to a crank angle location in which the threshold percentile of fuel in the combustion chamber 100 is burned.

At 315, the NOx correlation component 310 may determine an estimated NOx emissions level based on the one or more combustion parameters and may output the NOx emissions level to a comparator 320. In some implementations, the NOx correlation component 310 may store a function and may apply the function to received combustion parameter values to determine the estimated NOx emissions level. The function may apply different weight values to different combustion parameters and/or may indicate a manner in which different combustion parameters are to be combined to determine the estimated NOx emissions level from the input combustion parameters. The function may be a polynomial function, such as a first order polynomial function, a second order polynomial function, a third order polynomial function, or the like.

The NOx correlation component 310 may be capable of determining a highly accurate estimate of NOx emissions with relatively low computational complexity. For example, using two combustion parameters (e.g., a peak cylinder pressure location and a maximum heat release rate) and a second order polynomial function may result in highly accurate (e.g., 98% accurate) estimation of NOx emissions levels. The NOx correlation component 310 may determine an even more accurate estimation (e.g., 99% accurate) using three combustion parameters (e.g., a peak cylinder pressure location, a maximum heat release rate, and an ignition delay from a start of injection to a 10% fuel burn location) and a second order polynomial function. Further accuracy can be achieved using two combustion parameters or three combustion parameters with a third order polynomial function.

Additionally, or alternatively, the NOx correlation component 310 may store (e.g., in a data structure, a table, and/or the like) information that identifies a correspondence between respective sets of combustion parameter values and corresponding estimated NOx emissions levels. For example, the information may indicate a first NOx emissions level that corresponds to a first set of combustion parameter values, may indicate a second NOx emissions level that corresponds to a second set of combustion parameter values, and so on. The NOx correlation component 310 may determine a stored set of combustion parameter values that is closest to the received combustion parameter values, and may identify an estimated NOx emissions level that corresponds to the stored set of combustion parameters.

At 325, the control system 205 may receive a desired NOx emissions level. As shown, the desired NOx emissions level may be input to the comparator 320. The desired NOx emissions level may be stored in memory 215 and may correspond to maximum NOx emissions levels defined by regulatory agencies. In some cases, the desired NOx emissions level may vary depending on an engine load, an engine speed (e.g., measured in revolutions per minute (rpm)), and/or one or more combustion parameters. The desired NOx emissions level may be determined using a function and/or a data structure stored in memory 215 (e.g., a data structure that maps respective engine operating conditions to corresponding desired NOx emissions levels), in a similar manner as described above in connection with determining the estimated NOx emissions level.

The comparator 320 may compare the estimated NOx emissions level and the desired NOx emissions level. For example, the comparator may determine a difference between the desired NOx emissions level and the estimated NOx emissions level (e.g., by subtracting the estimated NOx emissions level from the desired NOx emissions level, or vice versa), a ratio between the desired NOx emissions level and the estimated NOx emissions level (e.g., by dividing the estimated NOx emissions level by the desired NOx emissions level, or vice versa), and/or the like. Based on the comparison, the comparator 320 may determine a NOx error. Because the desired NOx emissions level and the estimated NOx emissions level may both vary depending on engine operating conditions, dynamically determining these values during engine operation to calculate a NOx error may permit the control system 205 to quickly adjust pilot fuel quantity in response to changing engine operating conditions.

Figure 4:
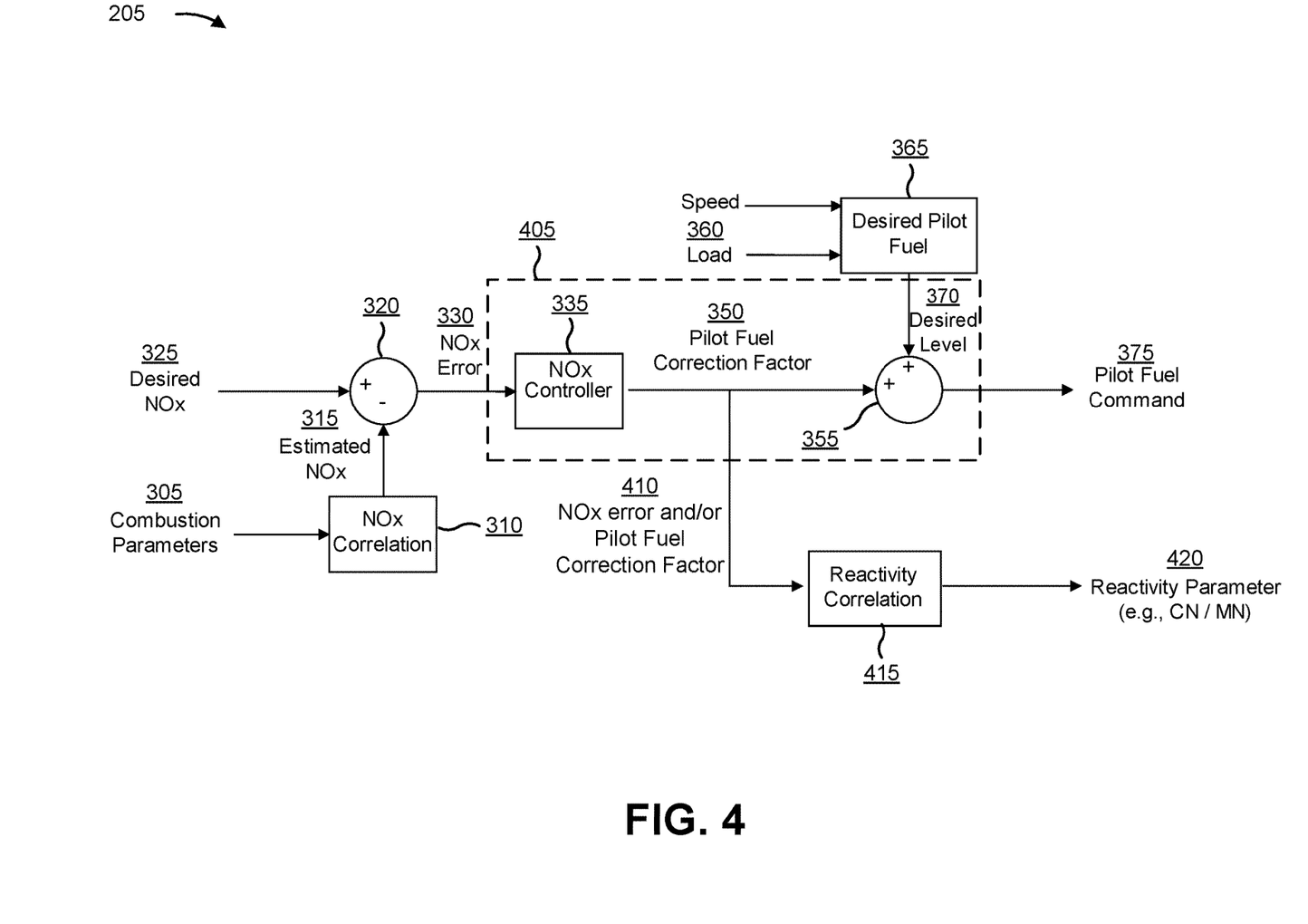
FIG. 4 is diagram of another example control system for controlling pilot fuel injection into a combustion chamber of an engine.

At 330, the comparator 320 may output the NOx error to a NOx controller 335. The NOx controller 335 may control a quantity of pilot fuel injected into the engine 101 based on the NOx error. In some implementations, the control system 205 may control the quantity of pilot fuel as shown in FIG. 3. Alternatively, the control system 205 may control the quantity of pilot fuel as shown in FIG. 4. The NOx controller (and/or the controller 210) may include a closed loop controller and/or a proportional-integral-derivative controller configured to control the quantity of pilot fuel injected into the engine 101 by applying a pilot fuel correction factor to reduce the NOx error.

At 340, the NOx controller 335 may determine a reactivity parameter (e.g., a fuel reactivity parameter) based on the NOx error. The reactivity parameter may represent a ratio between a cetane number (CN) of diesel fuel present in the engine 101 and a methane number (MN) of natural gas present in the engine 101 (shown as CN/MN). The cetane number and the methane number of the fuels may be measurable prior to fueling the engine or prior to operating the engine, but these numbers may not be directly measurable during operation of the engine and may vary during engine operation depending on a fuel mixture, engine operating conditions, and/or the like. By deriving or estimating the reactivity parameter during operation of the engine 101, the control system 205 can dynamically react to changing engine operating conditions by adjusting a quantity of pilot fuel rather than operating using static assumptions for the cetane number and the methane number determined outside of engine operation, thereby improving engine performance while complying with emissions standards. As shown, the NOx controller 335 may output the reactivity parameter to a pilot fuel correction component 345. The reactivity parameter may be used to control the quantity of pilot fuel injected into the engine 101, as described below.

At 350, the pilot fuel correction component 345 may determine a pilot fuel correction factor. For example, the pilot fuel correction component 345 may determine the pilot fuel correction factor based on the reactivity parameter. The controlled quantity of pilot fuel injected into the dual fuel engine may be inversely proportional to the reactivity parameter. That is, for a higher reactivity parameter, a lower quantity of pilot fuel may be injected as compared to a lower reactivity parameter (assuming other factors are held constant). The pilot fuel correction factor may be determined using a function and/or a data structure stored in memory 215 (e.g., a data structure that maps respective reactivity parameter values to corresponding pilot fuel correction factors), in a similar manner as described above. In FIG. 3, the pilot fuel correction factor is shown as being determined indirectly from the NOx error (e.g., by calculating a reactivity parameter from the NOx error and determining the pilot fuel correction factor from the reactivity parameter). In some implementations, the pilot fuel correction factor may be determined directly from the NOx error, as described below in connection with FIG. 4. As shown, the pilot fuel correction component 345 may output the pilot fuel correction factor to a comparator 355.

At 360, the control system 205 may receive an indication of a speed and/or a load associated with the engine 101. As shown, the indication may be input to a desired pilot fuel component 365. The speed (e.g., rpm) and/or the load may be measured by one or more sensors 220, and may be input to the desired pilot fuel component 365.

At 370, the desired pilot fuel component 365 may determine a desired pilot fuel level. For example, the desired pilot fuel level may be based on the speed and/or the load of the engine 101 (e.g., a higher pilot fuel level may be needed for a higher speed of the engine 101 and/or a higher load on the engine 101). The desired pilot fuel level may be determined using a function and/or a data structure stored in memory 215 (e.g., a data structure that maps respective speed and/or load values to corresponding desired pilot fuel levels), in a similar manner as described above. As shown, the desired pilot fuel component 365 may output an indication of the desired pilot fuel level to the comparator 355.

At 375, the comparator 355 may determine a pilot fuel command. The pilot fuel command may be determined based on the pilot fuel correction factor and the desired pilot fuel level. For example, the comparator 355 may adjust the desired pilot fuel level using the pilot fuel correction factor (e.g., by subtracting the pilot fuel correction factor from the desired pilot fuel level, by adding the pilot fuel correction factor to the desired pilot fuel level, or the like).

As shown, the comparator 355 may output the pilot fuel command, which may be used to control a quantity of pilot fuel injected into the combustion chamber 100 by one or more fuel injectors 114. For example, the pilot fuel command may be output to an actuator of a fuel injector 114 and/or to a controller that controls operation of the fuel injector 114. The pilot fuel command may indicate an amount of pilot fuel to be injected per injection (e.g., for one or more specific injections), a rate of injection, an injection timing, and/or the like.

As indicated above, FIG. 3 is provided as an example. Other examples may differ from what is described in connection with FIG. 3.

FIG. 4 is a diagram of another example control system 205 for controlling pilot fuel injection into a combustion chamber 100 of an engine 101. One or more operations described below in connection with FIG. 4 may be performed by control system 205 and/or one or more components of control system 205, such as controller 210, memory 215, and/or sensor(s) 220. Additionally, or alternatively, one or more components described below in connection with FIG. 4 may include or be included in controller 210, memory 215, and/or the like.

At 405, the control system 205 may determine the pilot fuel correction factor directly from the NOx error (e.g., rather than determining a reactivity parameter from the NOx error and using the reactivity parameter to determine the pilot fuel correction factor). For example, the NOx controller 335 may determine the pilot fuel correction factor using a function and/or a data structure stored in memory 215 (e.g., a data structure that maps respective NOx error values to corresponding pilot fuel correction factors), in a similar manner as described above. As shown, the pilot fuel correction component 345 may output the pilot fuel correction factor to a comparator 355, which may determine and output a pilot fuel command in a similar manner as described above.

At 410, the NOx controller 335 (or the comparator 320) may output the NOx error to a reactivity correlation component 415. Additionally, or alternatively, the NOx controller 335 may output the pilot fuel correction factor to the reactivity correlation component 415. The reactivity correlation component 415 may determine a reactivity parameter from the NOx error and/or the pilot fuel correction factor, in a similar manner as described above in connection with FIG. 3.

At 420, the reactivity correlation component 415 may output the reactivity parameter. In this case, the reactivity parameter may be output to a calibration component (not shown) that may calibrate one or more other components of FIGS. 2-4 to improve accuracy of one or more calculations. For example, the calibration component may adjust a function to result in a more accurate estimation, may adjust information stored in a data structure to result in a more accurate estimation, and/or the like.

As indicated above, FIG. 4 is provided as an example. Other examples may differ from what is described in connection with FIG. 4.

Figure 5:
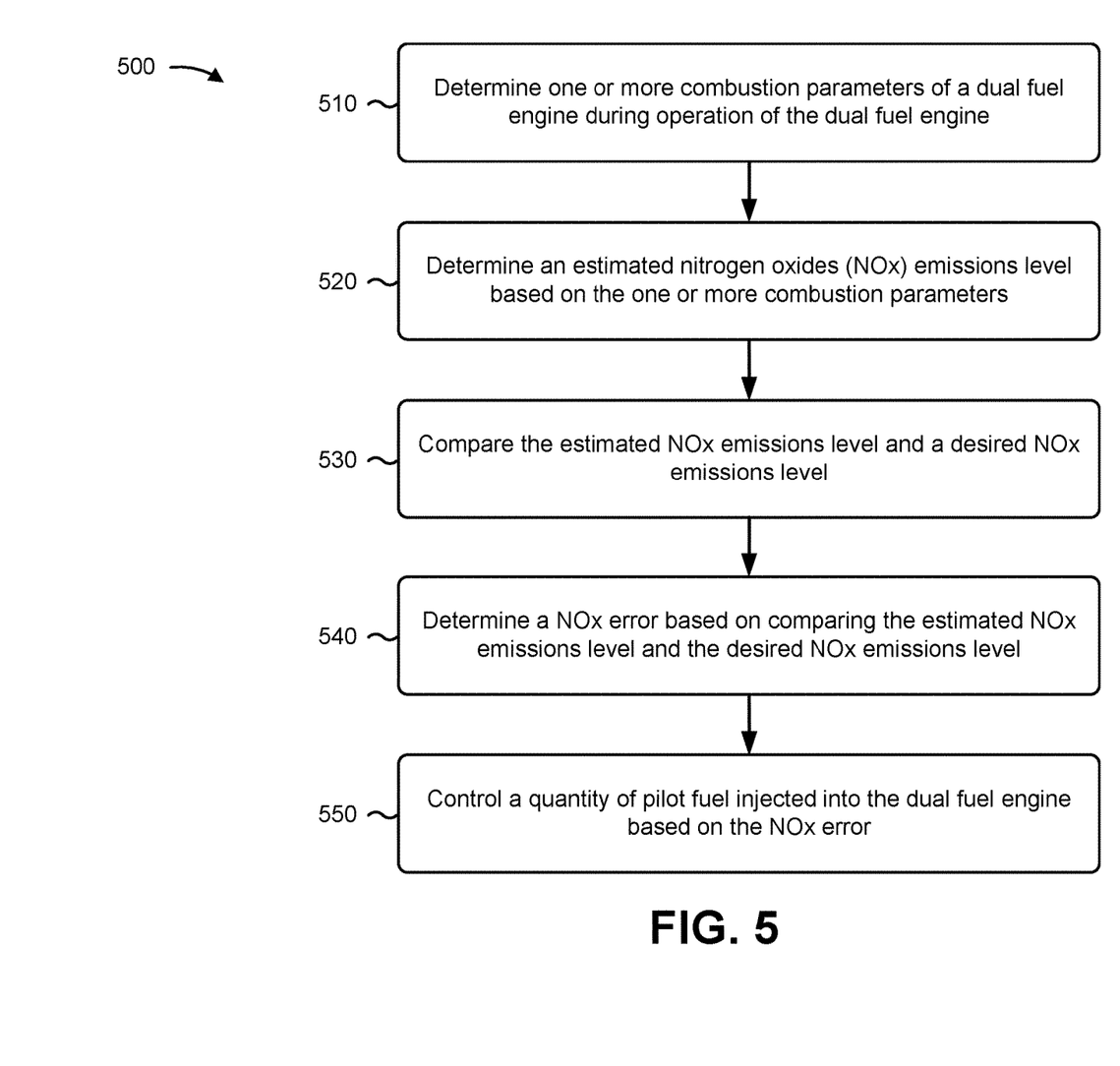
FIG. 5 is a flow chart of an example process for controlling pilot fuel injection into a combustion chamber of an engine.

FIG. 5 is a flow chart of an example process 500 for controlling pilot fuel injection in an engine. In some implementations, one or more process blocks of FIG. 5 may be performed by a control system (e.g., control system 205). In some implementations, one or more process blocks of FIG. 5 may be performed by another device or a group of devices separate from or including the control system 205, such as controller 210, memory 215, sensor(s) 220, fuel injector(s) 114, and/or the like.

As shown in FIG. 5, process 500 may include determining one or more combustion parameters of the dual fuel engine during operation of the dual fuel engine (block 510). As further shown in FIG. 5, process 500 may include determining an estimated NOx emissions level based on the one or more combustion parameters (block 520). As further shown in FIG. 5, process 500 may include comparing the estimated NOx emissions level and a desired NOx emissions level (block 530). As further shown in FIG. 5, process 500 may include determining a NOx error based on comparing the estimated NOx emissions level and the desired NOx emissions level (block 540). As further shown in FIG. 5, process 500 may include controlling a quantity of pilot fuel injected into the dual fuel engine based on the NOx error (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

By estimating and/or determining one or more parameters relating to engine operation (e.g., a NOx emissions level, a desired NOx emissions level, a NOx error, a reactivity parameter, a pilot fuel correction factor, a desired pilot fuel level, and/or the like) during operation of the engine 101, the control system 205 can quickly adjust pilot fuel quantity in response to changing engine operating conditions that impact these parameters. Furthermore, by using a reactivity parameter that represents a ratio of cetane number to methane number, the control system 205 can dynamically react to changing engine operating conditions by adjusting a quantity of pilot fuel rather than operating using static assumptions for the cetane number and the methane number determined outside of engine operation, thereby improving engine performance while complying with emissions standards. For example, the cetane number and the methane number of the fuels may be measurable prior to fueling the engine or prior to operating the engine or in simulations, but these numbers may not be directly measurable during operation of the engine and may vary during engine operation depending on a fuel mixture, engine operating conditions, and/or the like. As a result, the control system 205 may provide better engine performance, reduced NOx emissions, and/or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method for controlling pilot fuel injection in a dual fuel engine, comprising:
   determining, by a control system, one or more combustion parameters of the dual fuel engine during operation of the dual fuel engine;
   determining, by the control system, an estimated nitrogen oxides (NOx) emissions level based on the one or more combustion parameters;
   comparing, by the control system, the estimated NOx emissions level and a desired NOx emissions level;
   determining, by the control system, a NOx error based on comparing the estimated NOx emissions level and the desired NOx emissions level;
   deriving a fuel reactivity parameter based on the NOx error; and
   controlling, by the control system, a quantity of pilot fuel injected into the dual fuel engine based on the NOx error and the fuel reactivity parameter.

2. The method of claim 1, wherein the fuel reactivity parameter represents a ratio between a cetane number of diesel fuel present in the dual fuel engine and a methane number of natural gas present in the dual fuel engine.

3. The method of claim 2, wherein the controlled quantity of pilot fuel injected into the dual fuel engine is inversely proportional to the fuel reactivity parameter.

4. The method of claim 1, wherein the one or more combustion parameters include at least one of an instantaneous maximum heat release rate, a location of peak cylinder pressure, a combustion duration, an air fuel ratio, or a location of a threshold percentile fuel burn.

5. The method of claim 1, further comprising:
   determining a pilot fuel correction factor based on the NOx error;
   comparing the pilot fuel correction factor and a desired pilot fuel level; and
   controlling the quantity of pilot fuel injected into the dual fuel engine further based on comparing the pilot fuel correction factor to the desired pilot fuel level.

6. The method of claim 5, wherein the desired pilot fuel level is based on at least one of a speed or a load associated with the dual fuel engine.

7. The method of claim 1, wherein controlling the quantity of pilot fuel injected into the dual fuel engine includes at least one of:
   controlling an amount of pilot fuel injected into the dual fuel engine per injection, or
   controlling a rate of injection.

8. A control system for controlling pilot fuel injection in a dual fuel engine, the control system comprising:
   a memory;
   one or more sensors; and
   one or more controllers communicatively coupled to the memory and the one or more sensors, the one or more controllers being configured to:
      determine, using measurements from the one or more sensors, one or more combustion parameters associated with the dual fuel engine during operation of the dual fuel engine;
      determine an estimated nitrogen oxides (NOx) emissions level based on the one or more combustion parameters;
      determine a NOx error based on a comparison between the estimated NOx emissions level and a desired NOx emissions level;
      derive a fuel reactivity parameter based on the NOx error; and
      control a quantity of pilot fuel injected into the dual fuel engine based on the NOx error and the fuel reactivity parameter.

9. The control system of claim 8, wherein the fuel reactivity parameter represents an estimated ratio between a cetane number of diesel fuel present in the dual fuel engine and a methane number of natural gas present in the dual fuel engine.

10. The control system of claim 8, further comprising:
   determining a pilot fuel correction factor based on the fuel reactivity parameter and using a data structure, stored in the memory, that stores a plurality of pilot fuel correction factor values and a corresponding plurality of fuel reactivity parameter values; and
   controlling the quantity of pilot fuel injected into the dual fuel engine further based on the pilot fuel correction factor.

11. The control system of claim 8, further comprising:
determining a pilot fuel correction factor based on the NOx error and using a data structure, stored in the memory, that stores a plurality of pilot fuel correction factor values and a corresponding plurality of NOx error values; and
controlling the quantity of pilot fuel injected into the dual fuel engine further based on the pilot fuel correction factor.

12. The control system of claim 8, wherein the one or more combustion parameters include at least one of a peak cylinder pressure, a location of the peak cylinder pressure, a maximum rate of rise of cylinder pressure, an instantaneous maximum heat release rate, a location of the instantaneous maximum heat release rate, a location of a threshold percentile fuel burn, an ignition delay from a start of injection to a threshold percentile fuel burn location, a combustion duration for a burn location, an air fuel ratio, a humidity, or an exhaust gas recirculation parameter.

13. The control system of claim 8, wherein the one or more sensors include at least one of an in-cylinder pressure sensor, an air system sensor, or a humidity sensor.

14. The control system of claim 8, wherein the one or more controllers include at least one of a closed loop controller or a proportional-integral-derivative controller configured to control the quantity of pilot fuel injected into the dual fuel engine by applying a pilot fuel correction factor to reduce the NOx error.

15. The control system of claim 8, wherein the desired NOx emissions level is determined based on a load on the dual fuel engine.

16. A dual fuel engine, comprising:
a control system configured to:
determine one or more combustion parameters associated with the dual fuel engine;
determine an estimated nitrogen oxides (NOx) emissions level based on the one or more combustion parameters;
compare the estimated NOx emissions level and a desired NOx emissions level;
determine a NOx error based on comparing the estimated NOx emissions level and the desired NOx emissions level;
derive a fuel reactivity parameter based on the NOx error; and
control a quantity of pilot fuel injected into the dual fuel engine based on the NOx error and the fuel reactivity parameter.

17. The dual fuel engine of claim 16, wherein the one or more combustion parameters are measured or determined during operation of the dual fuel engine.

18. The dual fuel engine of claim 16, wherein the dual fuel engine is a micropilot engine that uses an amount of pilot fuel that is less than or equal to a threshold percent of total fuel combusted in the dual fuel engine.

19. The dual fuel engine of claim 16, wherein the dual fuel engine uses at least one of liquified natural gas or a synthetic derivative of liquified natural gas as combustion fuel.

\* \* \* \* \*